Dec. 17, 1935.                A. SIMEONE                2,024,889
                            MILK BOTTLE COVER
                            Filed Dec. 1, 1933
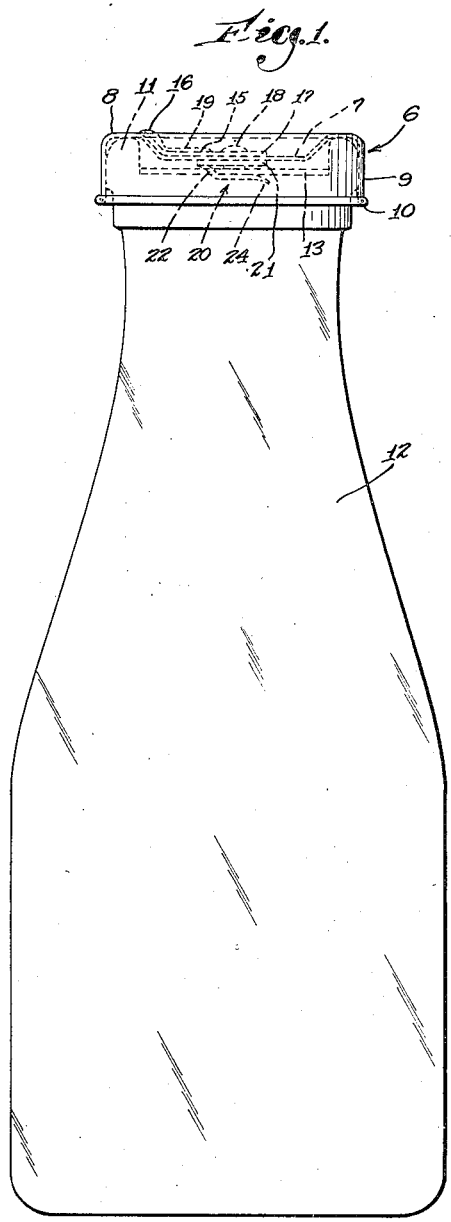
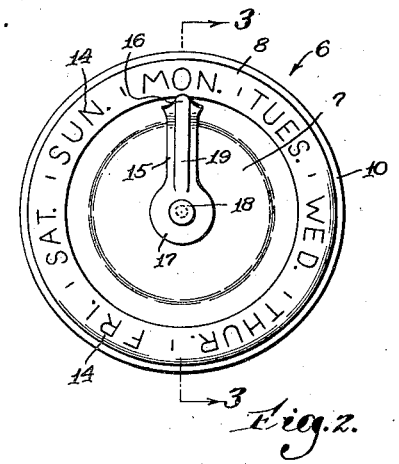
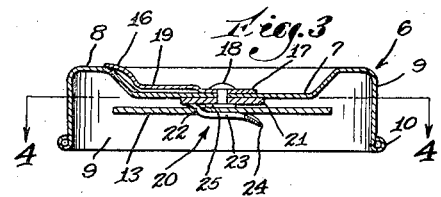
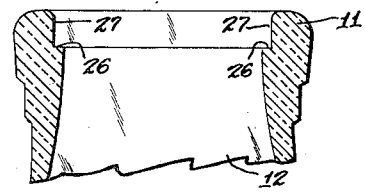
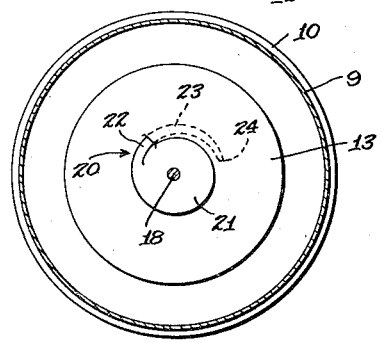
Inventor
Adolph Simeone
by Charles W. McDermott
his attorney Patented Dec. 17, 1935

2,024,889

UNITED STATES PATENT OFFICE 2,024,889

MILK BOTTLE COVER

Adolph Simeone, Somerville, Mass., assignor to T. J. Edwards Inc., Boston, Mass., a corporation of Massachusetts Application December 1, 1933, Serial No. 700,407

8 Claims. (Cl. 116—133)

The present invention relates to closures, and more particularly to a combined cover, cap remover, and milk age indicator for use on milk bottles.

In the days before widespread household electric refrigeration, preventing milk from souring was a problem constantly facing housewives. Ordinary icebox refrigeration had its limitations in that the temperature could never be below 32° F., and in fact was generally a few degrees higher. As a consequence, milk could not be preserved sweet for much more than twenty-four hours.

Electric refrigeration has greatly changed this situation. Temperatures lower than those made by mere ice now generally prevail, and the time during which milk will remain sweet has been thereby lengthened to several days. It is now a common thing to find in electric refrigerators several milk bottles in different states of fullness and representing several degrees of age. But while the problem of souring has been largely solved, there still remains the desire to know which milk is fresh as compared with milk a day or more old, and this raises the problem of providing some means whereby a housewife may tell the ages of the different bottles of milk in her refrigerator.

Accordingly, it is the principal object of the present invention to provide means for readily indicating the age of a given quantity of bottled milk. Broadly considered, merely dating the bottle cap itself or pasting a dated label on the bottle would serve the purpose, but such a procedure, simple as it is, is likely to come within the nuisance class, and besides, there are advantages in combining a milk age indicating means with a combined bottle cover and cap remover. With such a device a housewife may easily set the age indicator before she puts the milk away and then may have that indicator displayed prominently before her whenever she takes up the bottle to use the milk. The present invention therefore proposes the provision, in a combined bottle cover and cap remover provided with a cover member and a prong for piercing and retaining the cap so that it may be removed with the cover, of means carried by the cover for indicating the age of the milk in the bottle.

In the use of such covers for milk bottles, it is desirable that the paper cap should be restored to the bottle when it is replaced in the refrigerator. The reason for this is that bottle covers, effective as they may be for mere coverage, cannot make the air tight seal that is made by the usual paper cap in abutment with the shoulder and inner walls of the top of the bottle.

Accordingly, it is a further object of the present invention to provide a combined bottle cover and cap remover which, in addition to indicating the age of the milk, replaces the cap in the bottle in the proper position for sealing.

To the accomplishment of these objects and such others as may hereinafter appear, the features of the present invention reside in certain devices, combinations, and arrangements of parts fully set forth hereinafter and then pointed out in the appended claims, possessing advantages which will be readily apparent to those skilled in this art.

The various features of the present invention will be readily understood from an inspection of the accompanying drawing illustrating the best form of the invention at present known to the inventor, in which, Figure 1 is a view in elevation, partially in construction line, showing a milk bottle provided with a cover embodying the features of the present invention;

Fig. 2 is a view in plan of the cover;

Fig. 3 is a composite view comprising a sectional elevation of the cover taken along the line 3—3 of Fig. 2 and also a view in detail sectional elevation of the top portion of a milk bottle; and Fig. 4 is a view in sectional plan taken along the line 4—4 of Fig. 3.

The illustrated embodiment of the present invention is provided with a cover member 6 comprising a dished top portion 7 (Figs. 1, 2, and 3) surrounded by a peripheral ring 8, and a circular depending skirt 9, preferably provided with a bead 10 so that it may be more easily grasped for use. The inner diameter of the skirt 9 is such that it fits tightly around the top 11 of a glass milk bottle 12 provided with the usual paper cap 13 as shown in Fig. 1. The peripheral ring 8, as indicated in Fig. 2, carries indicia 14 representing the seven days of the week.

Mounted on the dished portion 7 is a pointer 15 (Figs. 1, 2, and 3) the pointing end 16 of which is bent upwardly at an angle to conform to the angle of the side walls of the dished portion 7, as shown in Fig. 3. The pointing end 16 terminates close to the indicia 14 past which the pointer 15 is adapted to be moved. For this purpose the pointer 15 may be rotatably mounted on its opposite end 17 at the center of the dished portion 7 by means of a rivet 18. To facilitate the manipulation of the pointer 15 it is preferably provided with a longitudinal ridge 19, as indicated in Figs. 2 and 3. The head of the rivet 18 presses against the end 17 of the pointer so that it is frictionally held in any position in which it is adjusted with relation to the indicia 14.

The end 17 (Fig. 2) of the pointer 15, secured by the rivet 18, is flat, and is rounded and wider than the shank of the pointer so that the area of that portion of the end 17 which engages the dished surface 7 of the cover will be considerably greater than the area of that portion of the end 17 which is engaged by the head of the rivet 18. The purpose of this construction will be explained hereinafter.

In order to remove the paper cap 13 from the milk bottle 12, the under surface of the dished portion 7 is provided with a pointed prong 20 (Figs. 1, 3, and 4) adapted to pierce and retain the cap 13 so as to remove it when the cover 6 is lifted from the bottle. As shown in Fig. 4, the prong 20 is cut from, and forms an integral part of, a substantially circular plate 21 provided with a central aperture through which passes the shank of the rivet 18. The plate 21 is secured fast to the under surface of the dished portion 7 by upsetting the end of the rivet. By making the plate 21 substantially circular before the prong 20 is formed, the prong itself is arcuate and substantially concentric with the skirt 9, as indicated in Fig. 4. It will be apparent, viewing Fig. 3, that since the prong 20 is formed from less than 180° of the circumferential material of the plate 21, a second prong, identical with the prong 20, may be cut from the opposite side of the plate.

The prong 20, as shown in Fig. 3, comprises three portions, a downwardly bent portion 22 at the point of juncture with the plate 21, a body portion 23 lying in a plane substantially parallel with the plate 21 and the dished surface 7, and a pointed end 24 preferably having a slight declination to facilitate the piercing of the cap 13 and the passage thereunder of the body portion 23 of the prong. The length of the downwardly bent portion 22 is such that the plane of the body portion 23 is spaced from the plate 21 a distance slightly greater than the thickness of the paper cap 13. This construction is shown in Figs. 1 and 3. As a practical matter, this difference between the thickness of the cap 13 and the spacing of the prong 20 from the plate 21 is compensated for by the upset end 25 of the rivet 18. As shown in Fig. 3, the top 11 of an ordinary milk bottle is provided with an inner shoulder 26 against which, and against the vertical walls 27 formed thereby, the paper cap 13 abuts to form a seal. Since this shoulder 26 lies below the uppermost portion of the bottle top 11, the dishing of the top of the cover 6 extends far enough down so that when the cover is in proper position on the bottle 12, the upset end 25 of the rivet 18 will contact the cap 13 as shown in Fig. 1.

In using the illustrated embodiment of the present invention, the cover 6 is first placed over the top 11 of the milk bottle 12 and is then pressed down with a slight clockwise rotary motion so that the pointed end 24 of the prong 20 pierces the paper cap 13. The rotation of the cover 6 clockwise around the top of the bottle is then continued with the result that the body portion 23 of the prong 20 passes along under the cap 13 until the pierced portion of the cap abuts the bent portion 22 of the prong. Since the prong 20 is arcuate and substantially concentric with the skirt 9, the cap 13 is not displaced or shifted by the prong in its passage through and under the cap. The cover 6 is then lifted bodily from the bottle 12, and since the cap 13 contacts the top of the body portion 23 of the prong 20, which in effect supports the cap from below, the cap is retained by the prong and is removed with the removal of the cover.

The cap 13 is properly re-positioned by simply replacing the cover 6 on the top 11 of the bottle. Since the dishing of the cover 6 corresponds to the depth of the shoulder 26 below the top of the bottle, when the cover 6 is replaced the upset end 25 of the rivet 18 forces the cap 13 into abutment with the shoulder 26. The original seal of the cap is thereby effected, and in addition, the cap aids in holding the cover in position on the bottle.

When it is desired to remove the cover 6 from the bottle without disturbing the cap 13 thereon, the cover is merely rotated counter clockwise, thereby causing the prong 20 to pass free and clear of the aperture pierced in the cap by the point 24.

The pointer 15 may be set with relation to the indicia 14 either before or after the cover 6 is applied to the bottle, and the movement of the pointer about the ring 8 is facilitated by the ridge 19. When a housewife purchases milk on a Monday, for example, she has merely to set the pointer to "Mon." (Fig. 2). Since the pointer is held in position frictionally by the head of the rivet 18, a mere handling of the bottle 12 does not dislodge or jar the pointer away from its reading. When the bottle is taken up at any time thereafter, the reading for the day on which the pointer was set will be prominently displayed since the cover must be handled before the milk can be used.

It was pointed out above that the area of surface contact between the wide end 17 of the pointer 15 and the dished portion 7 of the cover 6 was considerably greater than the area of surface contact between the wide end 17 and the head of the rivet 18. This is of practical importance when the pointer is set with relation to the indicia 14 before the cover is rotated on the bottle 12 to cause the prong 20 to pierce and pass under the cap 13. The upset end 25 of the rivet 18 holds the plate 21 fast against the cover 6 and thereby causes the plate and the prong to rotate with the cover when it is turned. If by chance the resistance of the cap 13 to piercing should tend to hold the prong stationary while the cover is rotated, the rivet 18 will remain stationary also, and the head of the rivet, pressing against the pointer 15, will thereby tend to hold the pointer stationary while the cover and its indicia 14 are moving. This undesirable result is prevented by the wide end 17 of the pointer 15, for the relatively great frictional grip of this wide end 17 against the cover overcomes any resistance to movement offered by the relatively small frictional grip on the pointer by the head of the rivet 18. With this construction the pointer 15 always moves with the cover 6 and is never dislodged from the position in which it is set with relation to the indicia 14, and this is true regardless of whether the prong 20 and plate 21 move or remain stationary when the cover 6 is rotated clockwise on the bottle.

The greater size of the plate 21 as compared to the size of the head of the rivet 18, best shown in Fig. 3, is of practical importance when the pointer is set with relation to the indicia 14 after the cover 6 is rotated on the bottle 12. The plate 21 offers greater frictional resistance against the under surface of the dished portion 7 than the head of the rivet 18 offers against the pointer 15. With this construction, a turning of the pointer 15 does not serve to rotate the rivet 18. As a consequence, when the pointer 15 is rotated clockwise to set it, with the cover 6 in position on the bottle 12 as shown in Fig. 1, the plate 21 and the prong 20 remain stationary and the cap 13 is not disturbed in any way in its position of sealing against the shoulder 26 and the walls 27. To the same end, the plate 21 and the prong 20 remain stationary when the pointer 15 is rotated counter clockwise to set it, so that this movement of the pointer does not serve to free the prong from the cap 13.

What is claimed as new, is:

1. In a closure for a container provided with a cap, the combination with a cover and a prong for piercing and retaining the cap during its removal, of means, engageable with the cap to hold it against the prong when the cover is removed, for securing the prong to the under surface of the cover.

2. In a closure for a container provided with a cap, the combination with a cover a portion of which is dished and a prong for piercing and retaining the cap during its removal, of means, adapted by reason of said dishing to engage the cap and hold it against the prong when the cover is removed, for securing the prong to the under surface of the dished portion of the cover.

3. A closure for a container provided with a cap, having, in combination, a cover provided with indicia, a pointer positioned on the cover in association with the indicia, at least one cap piercing and retaining prong positioned on the under surface of the cover, and means, adapted to engage the cap after it is pierced by the prong, for securing the pointer and the prong to the cover.

4. A closure for a container provided with a cap, having, in combination, a cover provided with indicia, a pointer positioned on the cover in association with the indicia, at least one cap piercing and retaining prong positioned on the under surface of the cover, and means, adapted to engage the cap after it is pierced by the prong, for securing the pointer movably to the cover and for securing the prong fast to the cover.

5. A closure for a container provided with a cap, having, in combination, a cover, a pointer rotatably secured to the cover, and at least one cap piercing and retaining prong secured to the cover for removing the cap when the cover is removed from the container, said prong comprising a downwardly bent portion, a pointed end, and a body portion located intermediate the bent portion and the pointed end and lying in a plane substantially parallel with that of the top of the cover.

6. A closure for a container provided with a cap, having, in combination, a cover, a pointer positioned on the cover, a plate positioned on the under surface of the cover and provided with an integral cap piercing and retaining prong comprising a downwardly bent portion, a pointed end, and a body portion located intermediate the bent portion and the pointed end and lying in a plane substantially parallel with that of the plate, and means, adapted to engage the cap after it is pierced by the prong, for securing the pointer and the plate to the cover.

7. In a closure for a container provided with a cap, the combination with a cover, of a substantially arcuate prong secured to the cover for piercing and retaining the cap during its removal, said prong comprising a downwardly bent portion, a downwardly pointed end, and a body portion intermediate the bent portion and the pointed end and lying in a plane substantially parallel with the top of the cover.

8. In a closure for a container provided with a cap, the combination with a cover, of a substantially arcuate prong secured to the cover for piercing and retaining the cap during its removal, said prong comprising a downwardly bent portion, a downwardly pointed end, and a body portion intermediate the bent portion and the pointed end and lying in a plane substantially parallel with the cap when the cover is placed on the container in position for cap removal.

ADOLPH SIMEONE.